United States Patent
Lim et al.

(10) Patent No.: US 10,305,539 B2
(45) Date of Patent: May 28, 2019

(54) ELECTRONIC APPARATUS AND CONTROLLING METHOD THEREOF

(71) Applicants: Samsung Electronics Co., Ltd., Suwon-si, Gyeonggi-do (KR); Seoul National University R&DB Foundation, Seoul (KR)

(72) Inventors: Sangsoon Lim, Seoul (KR); Weiping Sun, Seoul (KR); Sunghyun Choi, Seoul (KR); Woo-jin Park, Yongin-si (KR); Dae-hyun Ban, Seoul (KR); Seong-won Han, Seoul (KR)

(73) Assignees: Samsung Electronics Co., Ltd., Suwon-si (KR); Seoul National University R&DB Foundation, Seoul (KR)

( * ) Notice: Subject to any disclaimer, the term of this patent is extended or adjusted under 35 U.S.C. 154(b) by 0 days.

(21) Appl. No.: 15/455,853

(22) Filed: Mar. 10, 2017

(65) Prior Publication Data

US 2018/0026674 A1  Jan. 25, 2018

Related U.S. Application Data

(60) Provisional application No. 62/364,017, filed on Jul. 19, 2016.

(30) Foreign Application Priority Data

Nov. 18, 2016  (KR) .................. 10-2016-0153800

(51) Int. Cl.
*H04B 1/713* (2011.01)
*H04W 56/00* (2009.01)
(Continued)

(52) U.S. Cl.
CPC ............. *H04B 1/713* (2013.01); *H04B 1/715* (2013.01); *H04W 16/14* (2013.01);
(Continued)

(58) Field of Classification Search
CPC .......... H04W 56/002; H04W 56/0015; H04W 72/0446; H04W 72/0453
See application file for complete search history.

(56) References Cited

U.S. PATENT DOCUMENTS

| | | | |
|---|---|---|---|
| 7,362,817 B2 | 4/2008 | Ojard | |
| 2004/0125821 A1* | 7/2004 | Kuhl | H04B 7/269 370/503 |

(Continued)

FOREIGN PATENT DOCUMENTS

| | | |
|---|---|---|
| JP | 2005-236637 A | 9/2005 |
| KR | 10-2013-0139564 A | 12/2013 |

OTHER PUBLICATIONS

Farpoint Group, 802.11ac Action Plan: A Network-Readiness Checklist, A Farpoint Group Technical Note, Document FPG 2012-779.2, Apr. 2013.
(Continued)

*Primary Examiner* — Scott M Sciacca
(74) *Attorney, Agent, or Firm* — Jefferson IP Law, LLP

(57) ABSTRACT

A method for controlling an electronic apparatus and a method therefor are disclosed. The electronic device may be configured as a master device configured to control a piconet in a wireless communication network including a plurality of piconets. The controlling method includes periodically receiving, from an external coordinator device, radio frequency channel state information, virtual address information, and clock information corresponding to the piconet allocated by the coordinator device, and performing wireless data communication based on the radio frequency channel
(Continued)

state information, the virtual address information, and the clock information.

20 Claims, 14 Drawing Sheets

(51) Int. Cl.
    *H04W 72/04*     (2009.01)
    *H04W 16/14*     (2009.01)
    *H04B 1/715*     (2011.01)
    *H04W 84/12*     (2009.01)
    *H04W 84/18*     (2009.01)
    *H04W 4/80*     (2018.01)

(52) U.S. Cl.
    CPC ... *H04W 56/002* (2013.01); *H04B 2001/7154* (2013.01); *H04W 4/80* (2018.02); *H04W 84/12* (2013.01); *H04W 84/18* (2013.01)

(56) References Cited

U.S. PATENT DOCUMENTS

| | | | | |
|---|---|---|---|---|
| 2007/0183338 | A1* | 8/2007 | Singh | H04W 16/14 370/252 |
| 2010/0128624 | A1* | 5/2010 | Lee | H04L 41/06 370/252 |
| 2012/0026941 | A1 | 2/2012 | Ahmad et al. | |
| 2014/0064123 | A1* | 3/2014 | Kim | H04W 24/08 370/252 |
| 2014/0324974 | A1* | 10/2014 | Park | H04W 72/02 709/204 |
| 2015/0127823 | A1 | 5/2015 | Moeller et al. | |
| 2015/0222410 | A1 | 8/2015 | Belghoul et al. | |
| 2015/0270868 | A1 | 9/2015 | Park | |
| 2016/0037449 | A1* | 2/2016 | Kandhalu Raghu | H04W 52/0209 370/311 |

OTHER PUBLICATIONS

Atmel, Atmel At02845: Coexistence Between Zigbee and Other 2.4ghz Products, Atmel MCU Wireless, 42190A-MCU—Sep. 2013, 2013.

Kyung-Hwa Kim et al., WiSlow: A Wi-Fi Network Performance Troubleshooting Tool for End Users, IEEE Infocom, 2014.

Anwar Hithnawi et al., TIIM: Technology-Independent Interference Mitigation for Low-power Wireless Networks, ACM IPSN, 2015.

Cisco, Wireless RF Interference Customer Survey Result, White Paper, 2010.

IEEE Standards Association, IEEE Standard for Information Technology—Telecommunications and information exchange between systems—Local and metropolitan area networks—Specific requirements, Part 11: Wireless LAN Medium Access Control (MAC) and Physical Layer (PHY) Specifications Amendment 4: Enhancements for Very High Throughput for Operation in Bands below 6 GHz, IEEE Std 802.11ac-2013 (Amendment to IEEE Std 802.11-2012, Dec. 2013.

Alcatel-Lucent et al., LTE-U Forum: Technical Report: Coexistence Study for LTE-U SDL, V1.0, Feb. 2015.

N. Golmie et al., Bluetooth and WLAN Coexistence: Challenges and Solutions, IEEE Wireless Communications, vol. 10, No. 6, 2003, Gaithersburg, Maryland, USA, Feb. 2004.

Seung-Hwan Lee et al., Adaptive frequency hopping and power control based on spectrum characteristic of error sources in Bluetooth systems, Computers & Electrical Engineering, vol. 36, No. 2, pp. 341-351, 2010, Seoul, Republic of Korea, May 2009.

* cited by examiner

ELECTRONIC APPARATUS AND CONTROLLING METHOD THEREOF

CROSS-REFERENCE TO RELATED APPLICATION(S)

This application claims the benefit under 35 U.S.C. § 119(e) of a U.S. Provisional application filed on Jul. 19, 2016 in the U.S. Patent and Trademark Office and assigned Ser. No. 62/364,017, and under 35 U.S.C. § 119(a) of a Korean patent application filed on Nov. 18, 2016 in the Korean Intellectual Property Office and assigned serial number 10-2016-0153800, the entire disclosure each of which is hereby incorporated by reference.

JOINT RESEARCH AGREEMENT

The present disclosure was made by or on behalf of the below listed parties to a joint research agreement. The joint research agreement was in effect on or before the date the present disclosure was made and the present disclosure was made as a result of activities undertaken within the scope of the joint research agreement. The parties to the joint research agreement are 1) Samsung Electronics Co., Ltd. and 2) Seoul National University R&DB Foundation.

TECHNICAL FIELD

The present disclosure relates to an electronic apparatus and a controlling method thereof. More particularly, the present disclosure relates to an electronic apparatus for preventing interferences and collisions between radio frequency channels in a wireless network environment, and a controlling method thereof.

BACKGROUND

Wireless technologies and devices using shared frequency bands in wireless networks are increasing.

Generally, Wi-Fi, Bluetooth, and ZigBee share a band of 2.4 gigahertz (GHz). Devices that use the 2.4 GHz band have a variety of wireless devices, including microwave ovens, Bluetooth media players, and mobile phones.

In recent years, the use of various wearable devices equipped with Bluetooth is increasing. Bluetooth devices perform wireless data communications within a range of about 10 meters using the 2.4 GHz frequency spectrum in the industrial, scientific and medical (ISM) frequency band.

When at least two Bluetooth devices are connected to each other, one piconet is created. When various Bluetooth devices are mixed in the shared frequency band, a plurality of piconets are generated. At this time, the plurality of piconets operate independently of each other, and the wireless channel cannot be efficiently utilized in the common frequency band. That is, there is a problem that Bluetooth devices are degraded in radio performance due to interference with other peripheral devices sharing the 2.4 GHz band as well as with other Bluetooth piconets.

Therefore, there is a need for techniques to improve radio performance by minimizing interference and collisions between wireless devices in the 2.5 GHz band.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic apparatus for preventing interference and collision between radio frequency channels in a wireless network environment using an external coordinate device to increase communication efficiency between wireless devices, and a controlling method thereof.

In accordance with an aspect of the present disclosure, a method for controlling a wireless communication network of an electronic apparatus, the electronic apparatus configured as a master device for controlling a piconet among a plurality of piconets in the wireless communication network is provided. The method includes periodically receiving, from an external coordinator device, radio frequency channel state information, virtual address information, and clock information corresponding to the piconet allocated by the coordinator device, and performing wireless data communication based on the radio frequency channel state information, the virtual address information and the clock information.

In accordance with another aspect of the present disclosure, an electronic apparatus for controlling a wireless communication network, the electronic device configured as a master device for controlling a piconet among a plurality of piconets in the wireless communication network is provided. The electronic apparatus includes a transceiver configured to perform wireless network communication with an external device, and at least one processor configured to control the transceiver to periodically receive, from an external coordinator device, radio frequency channel state information, virtual address information, and clock information corresponding to the piconet allocated by the external coordinator device, and perform wireless data communication based on the radio frequency channel state information, the virtual address information and the clock information.

In accordance with an aspect of the present disclosure, a coordinator device for performing wireless communication with a plurality of piconets is provided. The coordinator device includes a transceiver configured to perform wireless communication with the plurality of piconets, and at least one processor configured to control the transceiver to periodically transmit radio frequency channel state information to the plurality of piconets, and allocate virtual address information and clock information corresponding to each of the plurality of piconets to each of the plurality of piconets.

As described above, according to various example embodiments of the present disclosure, it is possible to increase the communication efficiency of the electronic apparatus in the shared frequency band by searching the available channels of the piconet using the external coordinator device.

In addition, according to the various example embodiments of the present disclosure, the frequency channel interference between the piconets can be minimized in a wireless network environment comprising a plurality of piconets, thereby increasing the signal recognition rate of the electronic device.

Further, according to the various example embodiments of the present disclosure, it is possible to increase an available channel space of an electronic apparatus and another wireless communication standard using a shared frequency band.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
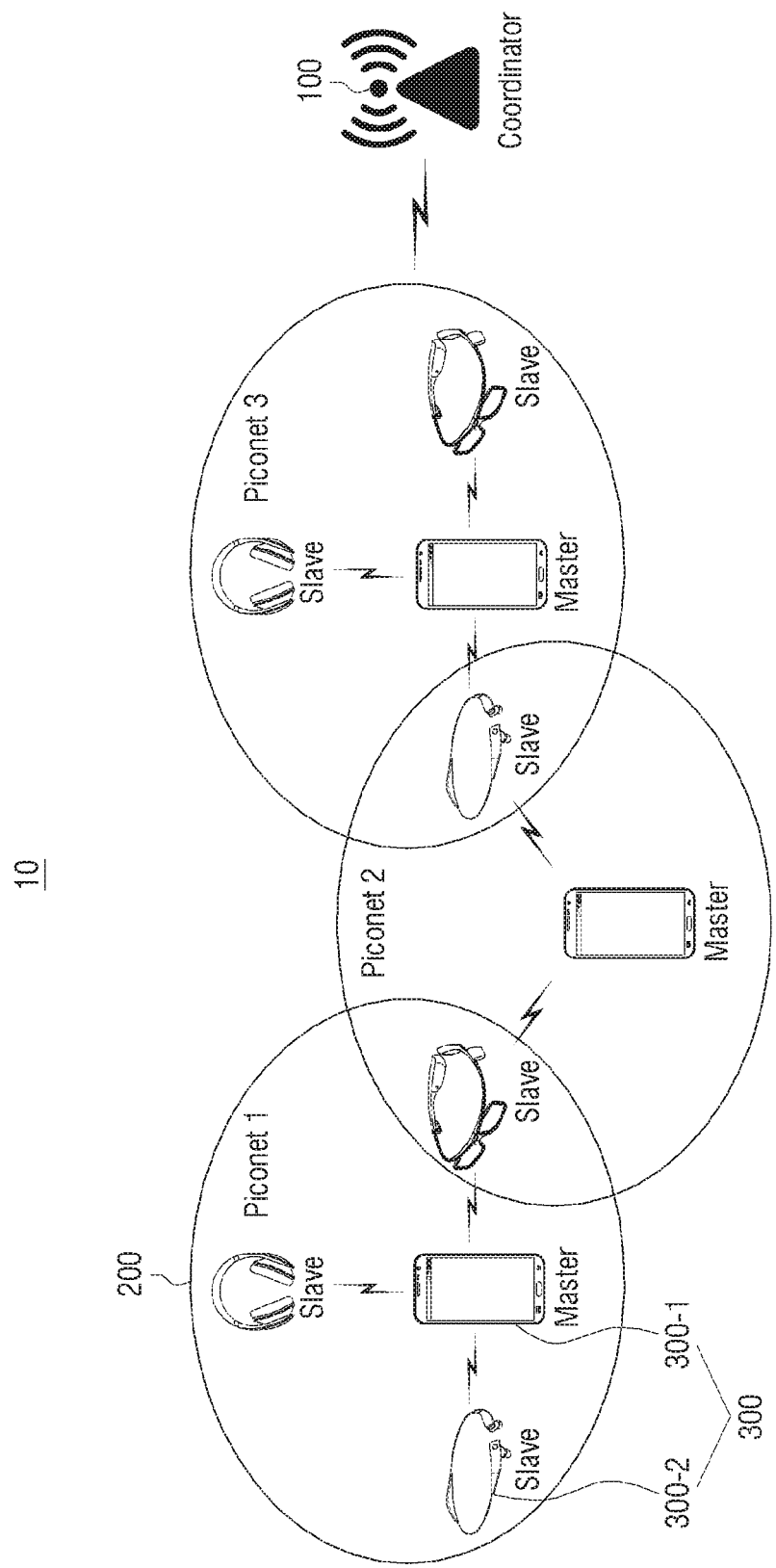
FIG. 1 is a diagram illustrating a wireless network system including a plurality of piconets according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "and/or" includes any combination of a plurality of related listed items or any of a plurality of related listed items.

The terms used in the present disclosure will be described in detail below with reference to the example embodiments described in the accompanying drawings. In addition, a method of manufacturing and using the present disclosure will be described in detail with reference to the contents described in the attached drawings. Like reference numbers or symbols in the various drawings indicate components or elements that perform substantially the same function.

The term "and/or" includes any combination of a plurality of related listed items or any of a plurality of related listed items.

In this specification, the terms "comprise", "include", "have", and the like are intended to specify that there are stated features, numbers, operations, elements, parts or combinations thereof, and should not be construed to preclude the presence or addition of one or more other features, integers, operations, elements, parts, or combinations. Like reference numerals in the drawings denote members performing substantially the same function.

In the drawings of the present disclosure, 'BT1', 'BT2', 'BT3', and 'BT4' refer to each piconet to which at least two Bluetooth devices are connected. "Bluetooth device" includes "electronic device" in this disclosure.

In this disclosure, "Wi-Fi" includes a wireless local area network (WLAN).

FIG. 1 is a diagram illustrating a wireless network system including a plurality of piconets according to an embodiment of the present disclosure.

Figure 2:
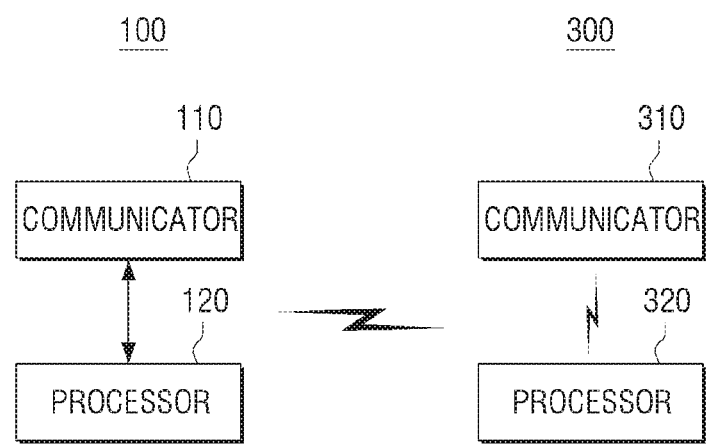
FIG. 2 is a simplified block diagram of an electronic apparatus and an external coordinator device according to an embodiment of the present disclosure.

Referring to FIGS. 1 and 2, a wireless network system 100 includes a Piconet 1, a Piconet 2, and a Piconet 3 as a coordinator 100, and a plurality of piconets 200. Although the various embodiments of the present disclosure illustrate that the system 10 includes three piconets, the example is not limited thereto. In other words, there can be fewer or more piconets.

For example, the coordinator 100 may be an external coordinator, an external coordinator device, or an external coordinator apparatus for externally controlling radio devices such as an access point (AP) or an Internet on things (IoT) hub. The coordinator 100 may also be a variety of smart devices capable of controlling other wireless devices.

For example, a smart device can be, but is not limited to, a smart phone, a tablet personal computer (PC), a mobile phone, and the like. The coordinator 100 may be a device supporting Bluetooth communication.

For example, piconet 200 and Piconet 1 are ad-hoc computer networks that connect a group of users of devices using a Bluetooth protocol. The piconet 200 may include one master device 300-1 and a plurality of slave devices 300-2. One of the electronic apparatuses 300 included in the piconet 200 is the master device 300-1 and the other is the slave device 300-2. One of the slave devices 300-2 may be the master device 300-1 and the master device 300-1 may be the slave device 300-2. The slave device 300-2 is controlled by the master device 300-1. The piconet 200 is synchronized based on the address information and the clock information of the master device 300-1. Accordingly, all the electronic devices 300 included in the piconet 200 may transmit data based on the frequency hopping sequence of the master device 300-1.

The electronic device or apparatus 300 may support adaptive frequency hopping (AFH) as a device using the Bluetooth protocol. For example, the electronic apparatus 300 may be, but not limited to, a Bluetooth headset, a Bluetooth MP3 player, a Bluetooth media player, a smart phone, a smart glass, and the like.

In general, all the electronic apparatuses 300 included in the piconet 200 each have a unique 48-bit address (BD_ADDR). The electronic apparatus 300 requests address information of another Bluetooth device and transmits address information of the electronic apparatus 300 to be connected to another Bluetooth device.

According to an example embodiment of the present disclosure, the electronic apparatus 300 may receive virtual address information and clock information of the piconet 200 including the electronic apparatus 300 from the external coordinator 100. That is, the virtual address information and the clock information received from the coordinator 100 by the master device 300-1 may be address information and clock information of the master device 300-1 and the plurality of slave devices 300-2 including the piconet 200. Accordingly, the Piconet 1, the Piconet 2, and the Piconet 3 may receive virtual address information and clock information corresponding to each piconet from the coordinator 100.

In addition, the coordinator 100 may allocate the virtual address information and clock information to each piconet, and transmit synchronization information generated by synchronizing each piconet to each piconet based on the allocated information. Therefore, each piconet may be synchronized by the clock information allocated by the coordinator 100.

The master device 300-1 may control a sequence of a frequency hopping based on the virtual address information allocated from the coordinator 100. The master device 300-1 may control the phase of the frequency hopping based on the virtual clock information allocated from the coordinator 100.

In the present disclosure, the electronic apparatus 300 may refer to the master device 300-1 of the piconet 200. Accordingly, the controlling method of the electronic apparatus 300 may be a method of controlling the piconet 200 including the electronic apparatus 300. In this disclosure, "communicate with a piconet" may, for example, refer to "communicate with the master device of a piconet". "To communicate with the master device of a piconet" may refer to "to communicate with an electronic apparatus" of the present disclosure.

A method of controlling the electronic apparatus 300 according to the example embodiments of the present disclosure will be described in detail in FIGS. 2, 3, 4B, 5B, 6B, 7B, 8, 9 and 10 below.

FIG. 2 is a simplified block diagram of an electronic apparatus and an external coordinator device according to an embodiment of the present disclosure. However, the configuration unit of the block diagram illustrated in FIG. 2 is not limited thereto and may include additional configuration units.

Referring to FIG. 2, a coordinator 100 may include a communicator 110 (e.g., a transceiver) and a processor 120 (e.g., at least one processor).

The communicator 110 may communicate with Bluetooth devices included in a plurality of piconets through wired and/or wireless network communications. The communicator 110 may transmit or receive a signal and data with the communicator 310 of the electronic apparatus 300.

The communicator 110 is configured to communicate with various kinds of external devices in various communication methods. The communicator 110 may include various communication chips such as a Wi-Fi chip, a Bluetooth chip (including Bluetooth low energy (BLE)), a near field communication (NFC) chip, a wireless communication chip, an IR chip, and the like. The NFC chip refers to a chip which operates in a NFC method using 13.56 MHz band among various radio-frequency identification (RF-ID) bands such as 135 kHz, 13.56 MHz, 433 MHz, 860-960 MHz, 2.45 GHz, and the like. The wireless communication chip refers to a chip which performs communication based on various communication standards such as institute of electrical and electronics engineers (IEEE), ZigBee, 3rd generation (3G), 3rd generation partnership project (3GPP), long term evolution (LTE), and the like.

The processor 120 may execute various programs stored in a memory.

The processor 120 may periodically transmit radio frequency channel state information to a plurality of piconets through the communicator 110, and allocate virtual address and clock information corresponding to each of the plurality of piconets to each of the plurality of piconets.

For example, the radio frequency channel may be a Wi-Fi channel of WLAN, but the example is not limited thereto.

The processor 120 may determine radio frequency channel state information based on occupancy state information of a radio frequency channel and busy time ratio information being used by the radio frequency channel. The processor 120 may generate a channel map including frequency channel information available for each of the plurality of piconets to perform data communication, and transmit a channel map to each of the plurality of piconets through the communicator 110.

For example, frequency channel information available for each of the plurality of piconets to perform data communication may be an available channel among 79 Bluetooth frequency hopping channels.

The processor 120 may determine a channel occupancy state of a Wi-Fi channel and a Bluetooth hopping channel sharing 2.4 GHz band, determine whether each channel is being used, and store information on busy time ratio used the most by each channel in a memory as radio frequency channel state information. In addition, the processor 120 may generate and store a channel map regarding what time each channel is available for use as a Bluetooth frequency hopping channel based on the radio frequency channel state information stored in the memory.

In addition, the processor 120 may periodically allocate virtual address information and clock information to each of a plurality of piconets using predetermined input parameters through the communicator 110. The processor 120 may be connected to a Bluetooth hop selection kernel which is a hardware device, and periodically allocate virtual address information and clock information with respect to each of the plurality of piconets to an input parameter "E" of the Bluetooth hop selection kernel. In general, a Bluetooth device includes hardware called hop selection kernel. The hop selection kernel may be used to determine a hopping sequence of a Bluetooth system.

The electronic apparatus 300 includes a communicator 310 (e.g., a transceiver) and a processor 320 (e.g., at least one processor). The electronic apparatus 300 may be a master device controlling slave devices of a piconet.

The communicator 310 may communicate with various external apparatuses via wire and/or wirelessly.

The communicator 310 may include a transceiver supporting Bluetooth adaptive frequency hopping (AFH). The communicator 310 may perform Bluetooth communication using time-division duplex (TDD) scheme.

The communicator 310 is configured to communicate with various kinds of external devices in various communication methods. The communicator 310 may include various communication chips such as a Wi-Fi chip, a Bluetooth chip (including Bluetooth BLE), an NFC chip, a wireless communication chip, an IR chip, and the like. The NFC chip refers to a chip which operates in a NFC method using 13.56 MHz band among various RF-ID bands such as 135 kHz, 13.56 MHz, 433 MHz, 860-960 MHz, 2.45 GHz, and the like. The wireless communication chip refers to a chip which performs communication based on various communication standards such as IEEE, ZigBee, 3rd Generation (3G), 3rd Generation Partnership Project (3GPP), Long Term Evolution (LTE), and the like.

The processor 320 may periodically receive radio frequency channel state information from an external coordinator device 100 through the communicator 310, receive virtual address information and clock information corresponding to a piconet allocated from the external coordinator device 100, and perform wireless data communication based on the received radio frequency channel state information, virtual address information and clock information.

The virtual address information and clock information may be periodically allocated to each of the plurality of piconets through predetermined input parameters of the coordinator device 100.

In addition, the radio frequency channel state information may, as mentioned above, be determined by the processor 120 of the coordinator device 100 based on the occupancy state information of the radio frequency channel and busy time ratio information being used by the radio frequency channel, and may be information on a channel map including frequency channel information available for each of the plurality of piconets to perform wireless data communication.

The processor 320 may synchronize time with piconets adjacent to piconets including the electronic apparatus 300 among a plurality of piconets, and control the synchronized time slot to perform frequency hopping.

The processor 320 may receive synchronization information between a plurality of piconets synchronized by the external coordinator device 100 based on virtual address information and clock information through the communicator 310.

The processor 320 may request the external coordinator device 100 for radio frequency channel information, and combine transmission power of piconets having the same time slot as a piconet including the electronic apparatus 300 among a plurality of piconets with transmission power of a piconet including the electronic apparatus 300 and transmit the combined transmission power to the external coordinator device 100 through the communicator 310.

The processor 320 may perform frequency hopping at a predetermined number of times of the number of Bluetooth channels. In this case, the radio frequency channel is a Wi-Fi channel, and the number of predetermined frequency channels may be the maximum number of Bluetooth channels that may be included in one Wi-Fi channel.

For example, the number of frequency hopping channels with which Bluetooth can communicate in 2.4 GHz may be 79. Each of the 79 channels has 1 megahertz (MHz). In addition, in 2.4 GHZ band, one Wi-Fi channel has about 20 MHz. Accordingly, the maximum number of Bluetooth channels that can be included in one Wi-Fi channel may be 20.

Accordingly, according to an example embodiment of the present disclosure, the processor 320 may perform frequency hopping at intervals of 20 frequency hopping channels.

Figure 3:
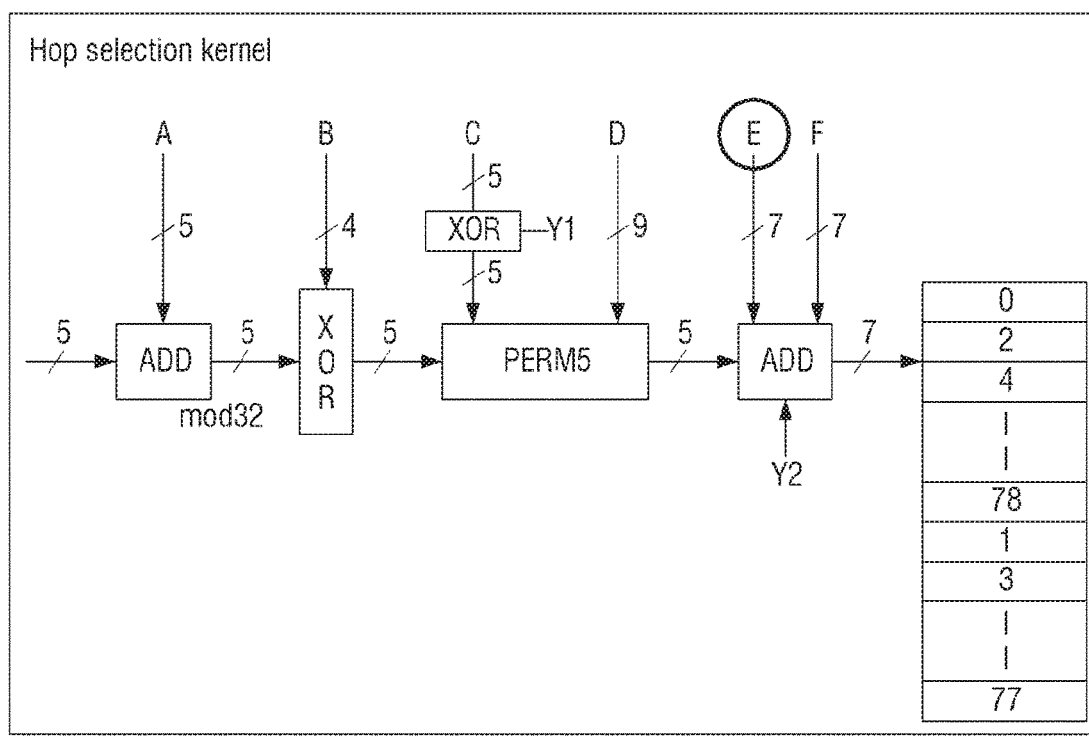
FIG. 3 is a simplified block diagram of a "Hop Selection Kernel" included in an external coordinator device according to an embodiment of the present disclosure.

FIG. 3 is a simplified block diagram of a hop selection kernel included in an external coordinator device according to an embodiment of the present disclosure.

In general, the Bluetooth device address is a 48 bit unique number. The hop selection kernel illustrated in FIG. 3 is hardware built in a Bluetooth device, which uses only lower 28 bits of the Bluetooth device address. In addition, the Bluetooth device has a 28-bit native clock. The clock determines timing and hopping of a Bluetooth transceiver. In addition, the clock is mutually synchronized with other Bluetooth devices.

The hop selection kernel has input parameters (X, Y1, Y2, A, B, C, D, E, F), and each of the input parameters has values corresponding to each parameter.

According to one example embodiment, in a wireless network system including a plurality of piconets, the input parameters (X, Y1, Y2, A, B, C, D, F) may be shared with the plurality of piconets. Meanwhile, the input parameter "E" may be allocated a constant offset that is unique to each of the plurality of piconets. For example, the input parameter "E" may be allocated to each of the plurality of piconets with a 28 bit address and 28 bit clock values. In addition, in order to generate time synchronization of a plurality of piconets, a virtual address and clock information, which is an offset-invariant corresponding to each piconet, may be periodically assigned to the input parameter "E".

The coordinator device 100 may allocate virtual address and clock corresponding to each of a plurality of piconets using the input parameter "E" of the hop selection kernel, and synchronize each piconet based on the allocated virtual address and clock and store the synchronization information in a memory.

Accordingly, according to an example embodiment of the present disclosure, Bluetooth devices included in a plurality of piconets request each other for address and clock information unique to each device, and thereby a time required for acquiring the requested information may be reduced.

Figure 4A:
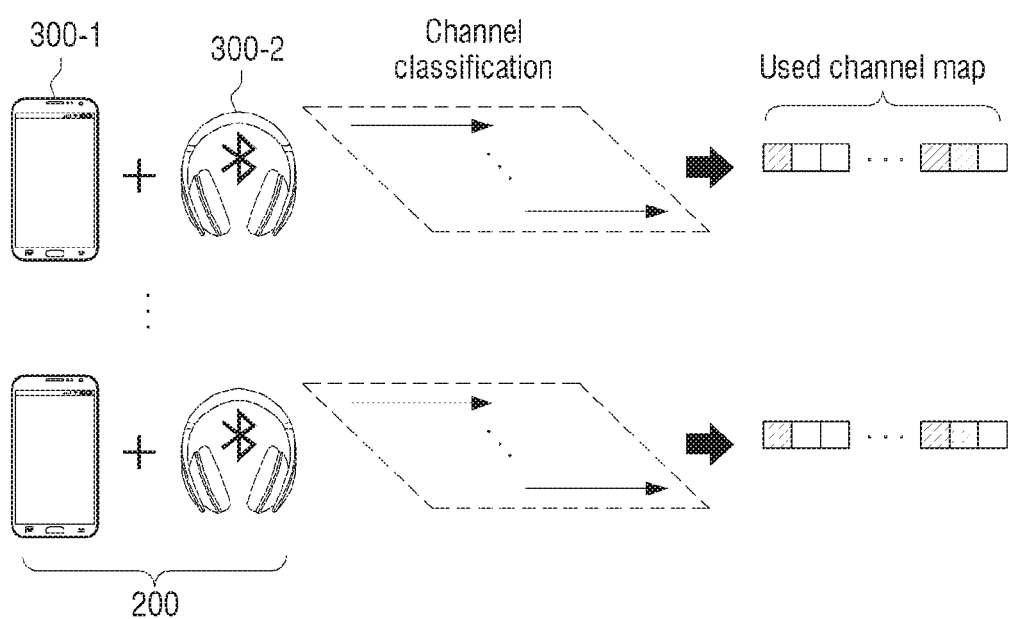
FIG. 4A is a diagram illustrating a method of searching for a channel available for each piconet in a plurality of piconets according to the related art.

FIG. 4A is a diagram illustrating a method of searching for a channel available for each piconet in a plurality of piconets according to the related art.

Referring to FIG. 4A, in general, a plurality of Bluetooth devices 300-1, 300-2 included in the piconet 200 may search for all of 79 Bluetooth hopping channels and generate a map of available channels.

Accordingly, for example, when a wireless network system includes three piconets as illustrated in FIG. 1, each of the three piconets search for channels available for each piconet in 79 channels, and generate a used channel map corresponding to each piconet. The above-mentioned method is performed in the master device 300-1 of each piconet. Accordingly, a channel classification time of a plurality of piconets according to a related-art method may be in the range of approximately 500 ms and 1500 ms.

Figure 4B:
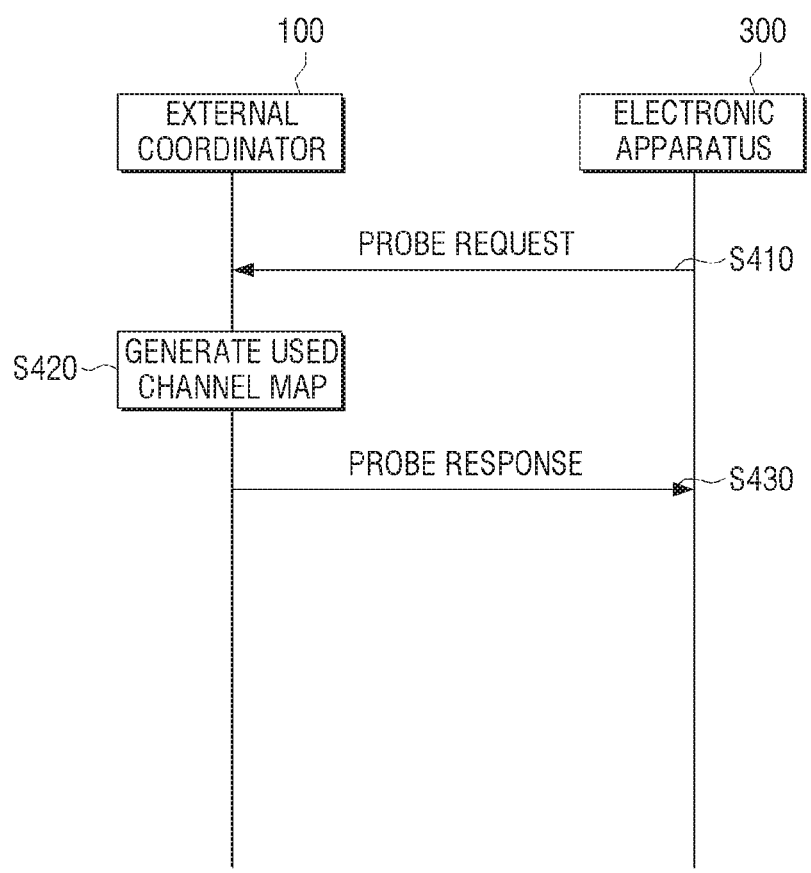
FIG. 4B is a diagram illustrating a method of searching for a channel available in each piconet in a plurality of piconets according to an embodiment of the present disclosure.

FIG. 4B is a diagram illustrating a method of searching for a channel available in each piconet in a plurality of piconets according to an embodiment of the present disclosure.

Referring to FIG. 4B, the electronic apparatus 300, which is the master device of each of a plurality of piconets, may transmit a "probe request frame" requesting network information to the external coordinator 100, at operation S410.

The external coordinator 100 may generate a map of channels available for a piconet including the electronic apparatus 300, at operation S420.

For example, the external coordinator 100 may determine occupancy state information of an occupied Wi-Fi channel among Wi-Fi channels and a busy time ratio of each of the Wi-Fi channels, and periodically transmit state information of the Wi-Fi channels to the electronic apparatus 300. In this case, the occupancy state information of the Wi-Fi channels may be information on whether the Wi-Fi channels are currently occupied or not. In addition, the busy time ratio of each of the Wi-Fi channels may be information on a time ratio most frequently used by each Wi-Fi channel. In addition, the external coordinator 100 may periodically transmit information on whether a Wi-Fi channel is currently an unused channel or a used channel to the electronic apparatus 300 as channel state information. In this case, information on the Wi-Fi channel includes information on 79 Bluetooth frequency hopping channels.

The external coordinator 100 may generate a used channel map generated by mapping available frequency hopping channels for a piconet including the electronic apparatus 300 by time based on channel state information.

The external coordinator 100 may periodically transmit the generated used channel map to the electronic apparatus 300 as a probe response, at operation S430.

The electronic apparatus 300 may select channel and time to perform frequency hopping and perform frequency hopping based on the used channel map information received from the external coordinator 100.

According to an example embodiment, the electronic apparatus 300 may not divide 79 channels by channel and individually generate used channel map to search for available frequency hopping channel. Accordingly, according to an example embodiment of the present disclosure, it may take a time in the range of approximately 40 ms to 520 ms to search for frequency hopping channels.

Figure 5A:
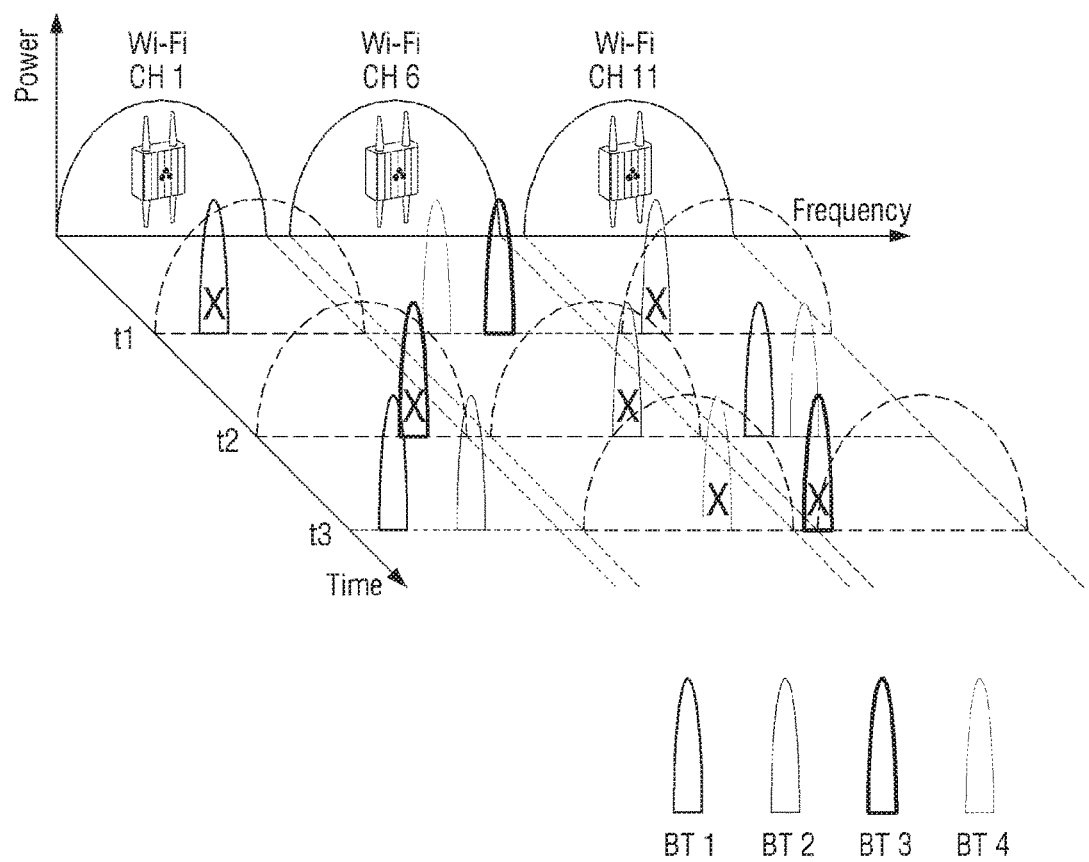
FIG. 5A is a diagram illustrating a method of recognizing a piconet when a plurality of piconets share a Wi-Fi channel according to the related art.

FIG. 5A is a diagram illustrating a method of recognizing a piconet when a plurality of piconets share a Wi-Fi channel according to the related art.

Referring to FIG. 5A, in the 2.4 GHz band, channel 1, channel 6, and channel 11 are mostly used among the Wi-Fi channels. Channel 1, channel 6, and channel 11 are channels that do not overlap with each other.

For example, there may be four piconets (BT1, BT2, BT3, BT4) in the 2.4 GHz band. The four piconets may be located in the area of different Wi-Fi channels in the same time period. At this time, the Wi-Fi may detect only the transmission power of at least two piconets existing in the same Wi-Fi channel area at the same time having the designated piconet signal that the Wi-Fi can detect among four piconets. Therefore, the remaining piconets that are not detected are hidden in the Wi-Fi channel. That the piconet signal that can be detected by the Wi-Fi is more than the sum of at least two piconet signals present in the same Wi-Fi channel is only an example embodiment to describe the present disclosure. However, the example is not limited thereto.

In general, the nominal output power of a Bluetooth device is 0 dBm. The rated output power of the Wi-Fi device is 10 to 20 dBm and the energy sensing threshold is −62 dBm. Thus, if the Bluetooth signal is weak, the Wi-Fi device may not find the Bluetooth device and the Bluetooth piconet may be hidden by the nearby Wi-Fi.

Typically, the nominal visible range for the line of sight (LOS) in the Wi-Fi band is less than 20 m and the visible area for near line of sight (NLOS) is less than 10 m.

For example, suppose that the distance between the master device and the slave device of the piconet is 1 meter and the Wi-Fi output power is 20 dBm. At this time, the rated interference area for line of sight (LOS) is within 50 meters, and the visible area for NLOS may be within 15 meters. Also, the hidden range of the piconet for the LOS may be 20 to 50 meters, and the hidden area for the NLOS may be 10 to 15 meters.

Thus, a blind Bluetooth piconet may collide with other piconets or other wireless devices.

Figure 5B:
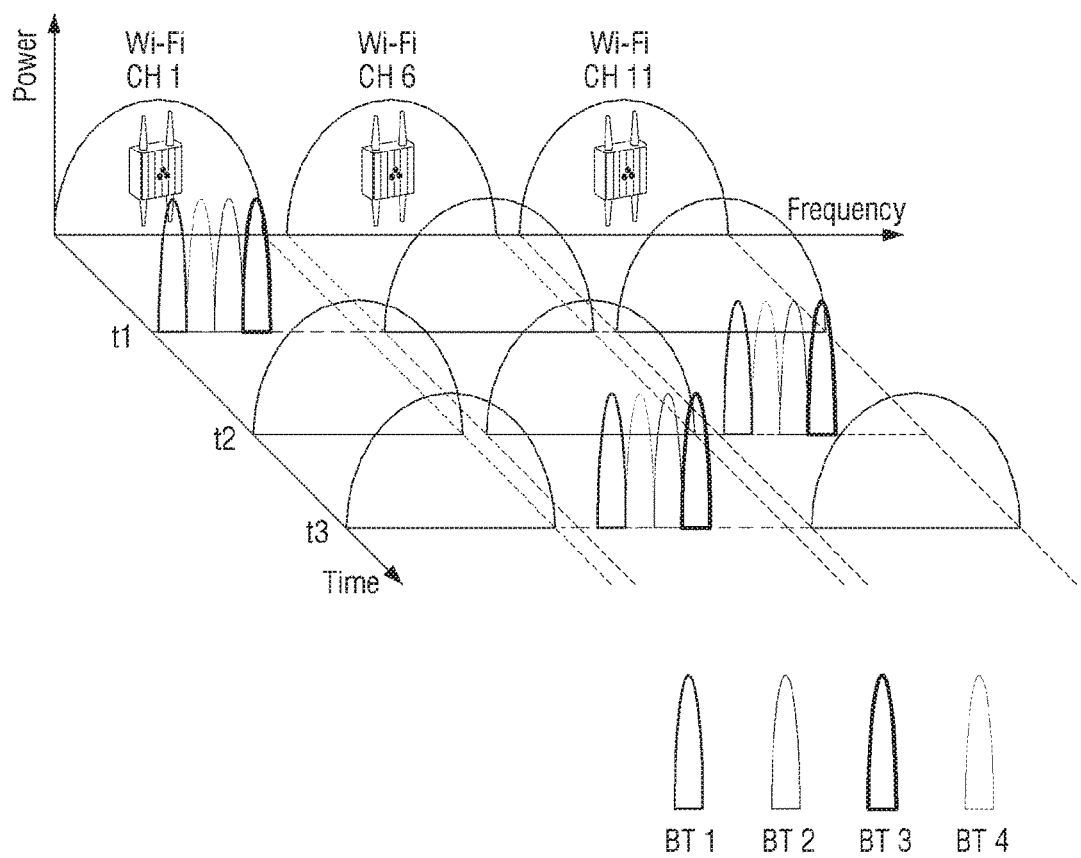
FIG. 5B is a diagram illustrating a method of recognizing a piconet when a plurality of piconets and a Wi-Fi channel are shared according to an embodiment of the present disclosure.

FIG. 5B is a diagram illustrating a method of recognizing a piconet when a plurality of piconets and a Wi-Fi channel are shared according to an embodiment of the present disclosure.

Referring to FIG. 5B, the electronic apparatus 300 may receive synchronization information between a plurality of piconets (BT1, BT2, BT3, BT4) synchronized based on virtual address information and clock information from an external coordinator device 100.

Therefore, the electronic apparatus 300 may acquire information on other piconets located in an adjacent channel to the channel being used by a piconet including the electronic apparatus 300 from the coordinator device.

The electronic apparatus 300 may, in response to requesting the external coordinator device 100 for radio frequency channel information, based on synchronization information by the external coordinator device 100, combine the transmission power of piconets having the same time slot as the piconet including the electronic apparatus 300 among a plurality of piconets with the transmission power of a piconet including the electronic apparatus 300 and transmit the transmission power to the external coordinator device 100.

For example, if it is supposed that BT2 is a piconet including the electronic apparatus 300, the electronic apparatus 300 may combine the transmission power of other piconets BT1, BT3, BT4 having the same time slot t1 as BT2 in the time slot t1 with the transmission power of BT2 and transmit the Bluetooth signal to the external coordinator device 100. In this case, the Wi-Fi may sense all of the plurality of piconets BT1, BT2, BT3, BT4 in the Wi-Fi channel 1.

As another example, BT2 may combine the transmission power of other piconets having the same time slot t2 with BT2 in the time slot t2 with the transmission power of BT2 and transmit the Bluetooth signal to the external coordinator device 100. In this case, the Wi-Fi may sense all of the plurality of piconets BT1, BT2, BT3, BT4 in the Wi-Fi channel 11.

In addition, BT3 may combine the transmission power of other piconets having the same time slot t3 as BT2 in the time slot t3 with the transmission power of BT2 and transmit the Bluetooth signal to the external coordinator device 100. In this case, the Wi-Fi may sense all of the plurality of piconets BT1, BT2, BT3, BT4 in the Wi-Fi channel 6.

That is, according to an example embodiment of the present disclosure, the electronic apparatus 300 may improve a signal sensing ratio in the Wi-Fi channel bandwidth using Bluetooth channels in which a plurality of piconets are adjacent to each other.

According to the example embodiment described above, when the transmission power of four piconets are combined in the same time slot using the electronic apparatus 300, the nominal visible range in which the Wi-Fi for line of sight (LOS) may sense a Bluetooth piconet signal may be within 42 meters.

Therefore, as described in FIG. 5A, when it is supposed that the Wi-Fi output power is 20 dBm, the hidden range of the piconet according to one example embodiment of the present disclosure illustrated in FIG. 5B may be an area in the range of 42 meters and 50 meters. That is, according to an example embodiment of the present disclosure, the hidden range is decreased compared with the hidden range (22 m~55 m) of a piconet according to the related art described in FIG. 5A, and thereby the visibility of a piconet in the Wi-Fi channel area may be improved.

Figure 6A:
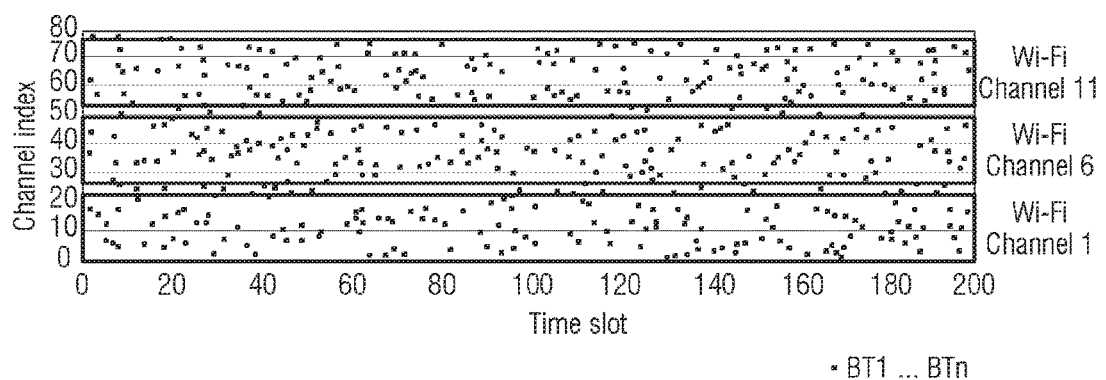
FIG. 6A is a diagram illustrating the visibility of a plurality of piconets in a shared frequency band according to the related art.
Figure 6B:
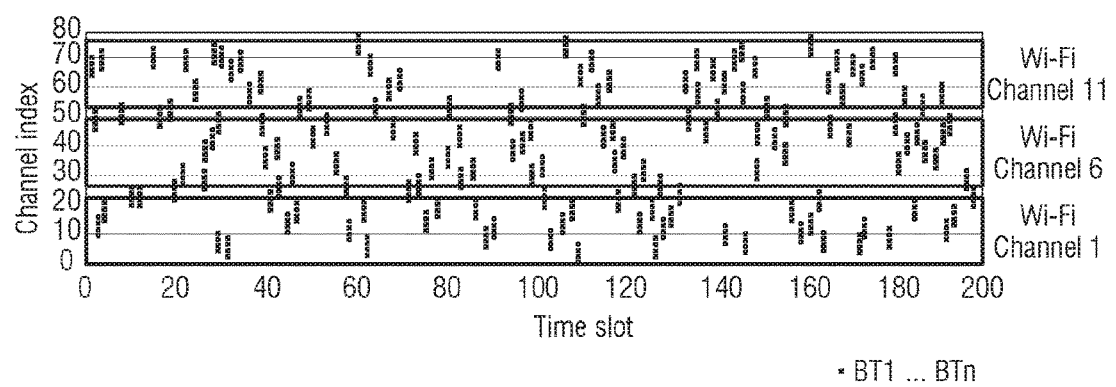
FIG. 6B is a diagram illustrating the visibility of a plurality of piconets in a shared frequency band according to an embodiment of the present disclosure.

FIGS. 6A and 6B are diagrams illustrating the visibility of a plurality of piconets in a shared frequency band.

FIG. 6A is a diagram illustrating the visibility of a plurality of piconets in a shared frequency band according to a method according to the related art, and FIG. 6B is a diagram illustrating the visibility of a plurality of piconets in a shared frequency band according to an embodiment of the present disclosure.

Referring to FIGS. 6A and 6B, in FIG. 6A, since the transmission power of a plurality of piconets are transmitted independently of each other, the number of piconets recognized in each Wi-Fi channel in the same time band in which the plurality of piconets are synchronized is less than in FIG. 6B.

Figure 7A:
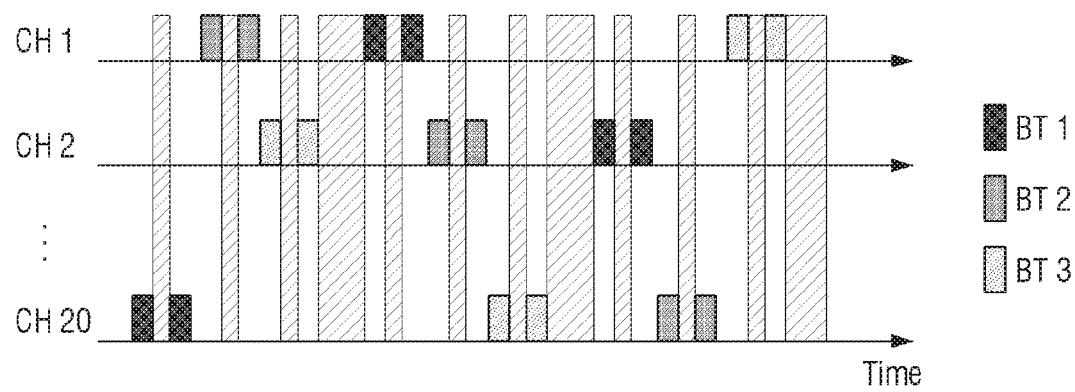
FIG. 7A is a diagram illustrating an available band width according to a frequency hopping sequence of a plurality of piconets according to the related art.

FIG. 7A is a diagram illustrating an available band width according to a frequency hopping sequence of a plurality of piconets according to the related art.

Referring to FIG. 7A, in general, a plurality of piconets independently perform frequency hopping irrespective of adjacent piconets, and thus, collision between a Wi-Fi device and a Bluetooth device is increased. Accordingly, a frequency band in which a Wi-Fi device can be used is decreased. In addition, since a piconet hops 79 frequency channels capable of performing data communication, a Bluetooth performance is decreased.

Figure 7B:
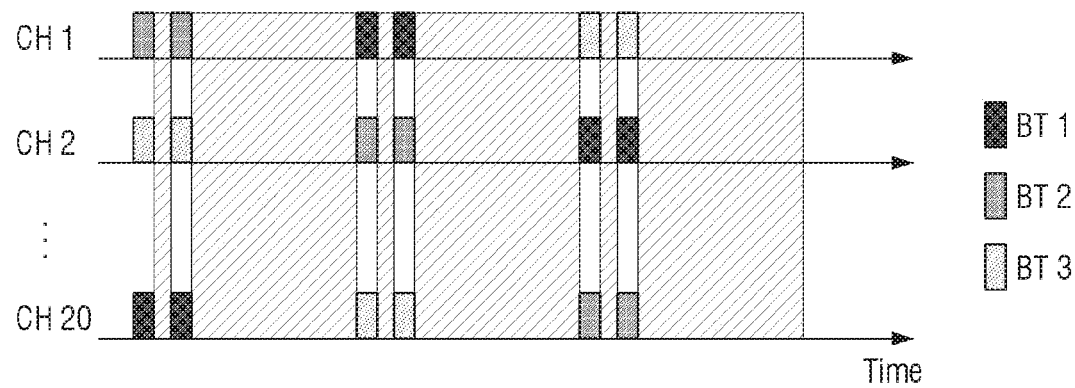
FIG. 7B is a diagram illustrating the available bandwidth according to the frequency hopping sequence of a plurality of piconets according to an embodiment of the present disclosure.

FIG. 7B is a diagram illustrating the available bandwidth according to the frequency hopping sequence of a plurality of piconets according to an embodiment of the present disclosure.

Referring to FIG. 7B, the electronic apparatus 300 may perform frequency hopping at intervals with a predetermined number of Bluetooth channels. The predetermined number of frequency channels may be the maximum number of Bluetooth channels that may be included in one Wi-Fi channel. For example, the predetermined number of Bluetooth channels may be 20 out of 79 frequency hopping channels.

The electronic apparatus 300 may synchronize time with piconets adjacent to frequency channel that is available for use by the piconet including the electronic apparatus 300 among a plurality of piconets, and perform frequency hopping in the synchronized time slot.

For example, the electronic apparatus 300 may be a master device included in the piconet BT1. The electronic apparatus 300 may synchronize the BT2(CH1) and BT3 (CH2), which are piconets adjacent to the frequency channel 20 that is available for use by BT1 out of a plurality of piconets BT2 and BT3, in the same time slot. Accordingly, the BT1(CH20), BT2(CH1) and BT3(CH2) may be synchronized in the same time slot. The BT1(CH1), BT2(CH2) and BT3(CH20) may be synchronized in the same time slot. The BT1(CH2), BT2(CH20) and BT3(CH1) may be synchronized in the same time slot.

Accordingly, according to an example embodiment, the Wi-Fi available section (area indicated by diagonal lines) of the electronic apparatus 300 and the wireless network system may be increased by 80% compared with the related-art method illustrated in FIG. 7A.

In addition, the electronic apparatus 300 according to an example embodiment of the present disclosure may hop 79 Bluetooth hopping channels by 20 channel period without hopping them all, and thereby the hopping channel search time of the electronic apparatus 300 may be reduced.

Figure 8:
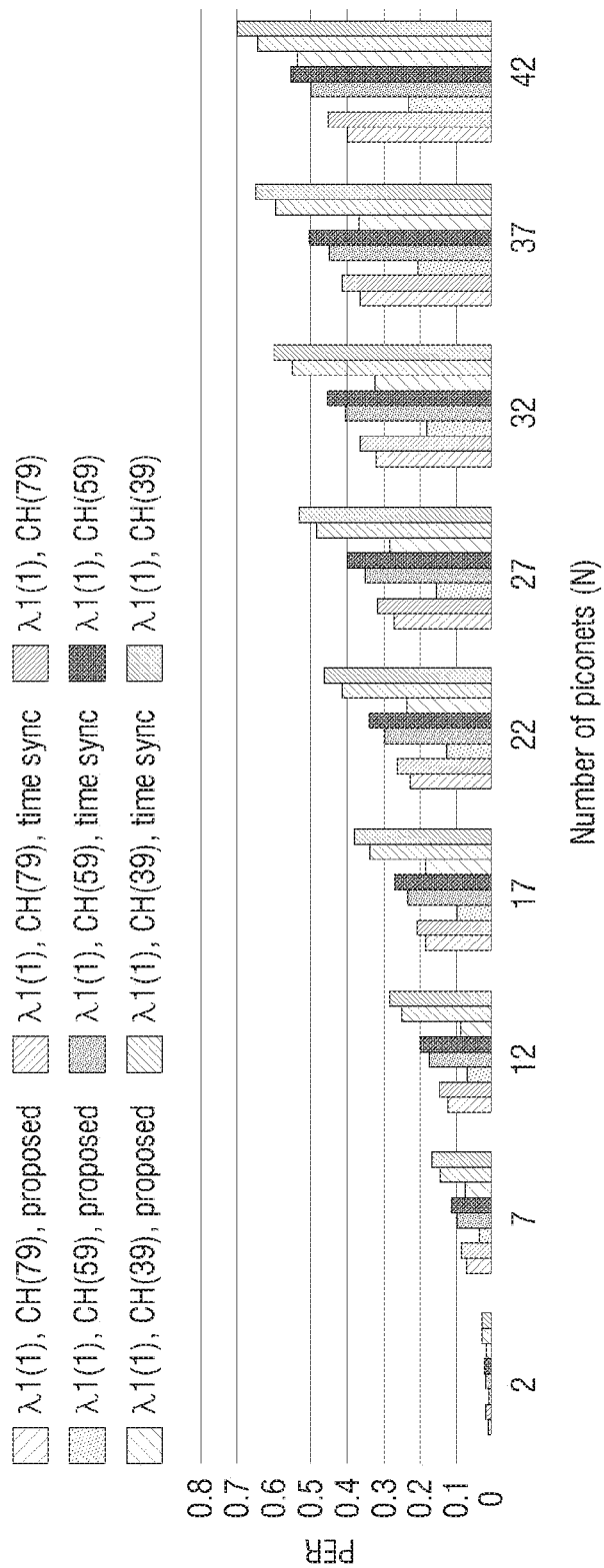
FIG. 8 is a graph illustrating packet error rates of a plurality of piconets according to an embodiment of the present disclosure.

FIG. 8 is a graph illustrating packet error rates of a plurality of piconets, according to an embodiment of the present disclosure.

Referring to FIG. 8, according to an example embodiment of the present disclosure described in FIGS. 1 to 3, 4B, 5B, 6B and 7B, the packet error rate (PER) of the wireless network system including the electronic apparatus 300 and the coordinator device 100 is reduced compared with the related-art technique as the number of piconets increases.

For example, according to an example embodiment, the system ("proposed") may have a 56% packet error rate reduction in CH59 and a 37% packet error rate reduction in CH39 over the related art ("time sync") performing time synchronization. In addition, according to an example embodiment, the system ("proposed") may reduce the packet error rate by 61.6% in CH50 and the packet error rate by 43.8% in CH39, compared with the general Bluetooth frequency hopping method.

Figure 9:
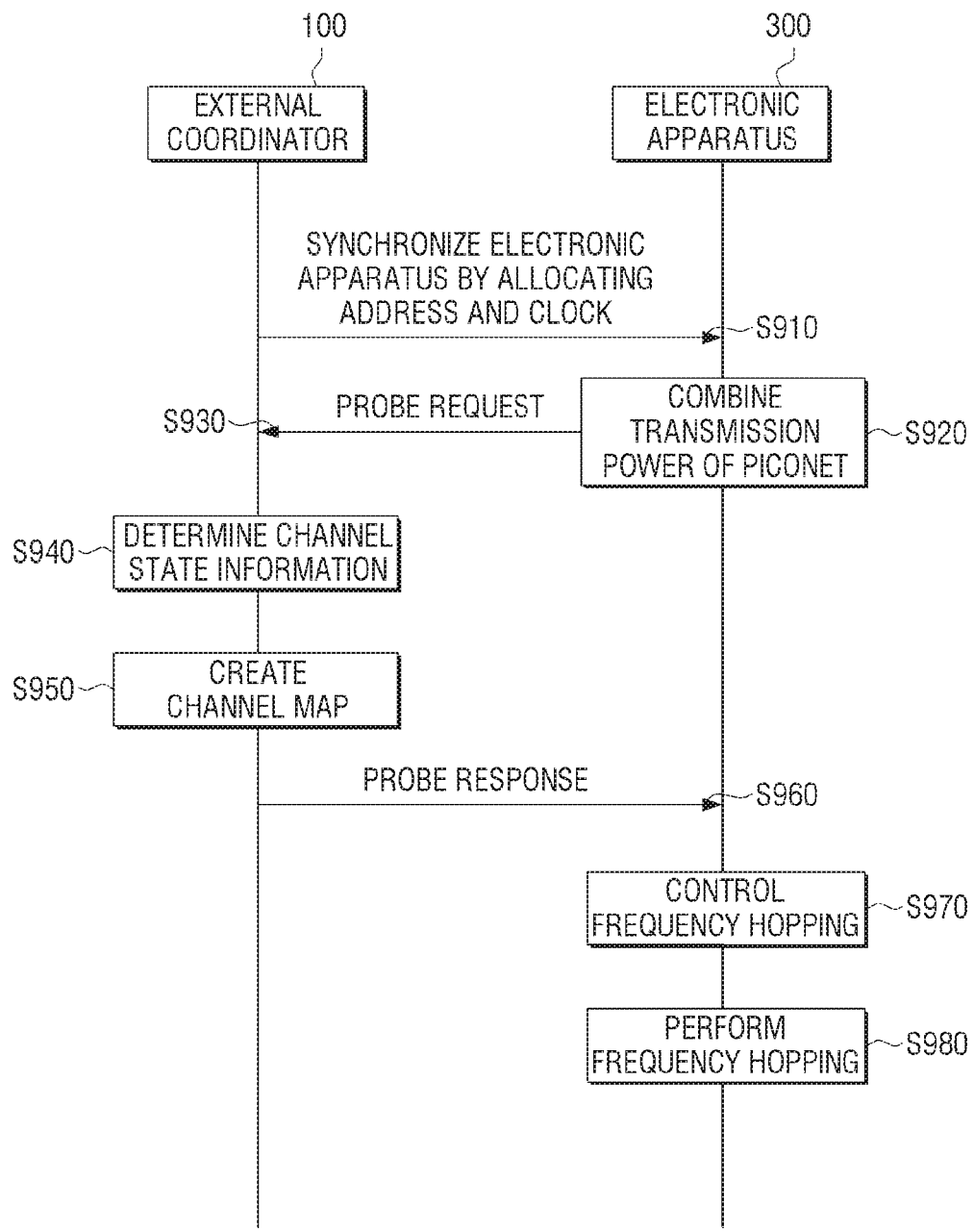
FIG. 9 is a sequence diagram of an electronic apparatus and an external coordinator apparatus for explaining a control method of an electronic apparatus according to an embodiment of the present disclosure.

FIG. 9 is a sequence diagram of an electronic apparatus and an external coordinator apparatus for explaining a control method of an electronic apparatus according to an embodiment of the present disclosure.

Referring to FIG. 9, at operation S910, the external coordinator 100 may allocate virtual address and clock to the electronic apparatus 300 and synchronize piconets different from the piconet including the electronic apparatus 300.

At operation S920, the electronic apparatus 300 may combine the transmission power of piconets adjacent to the piconet including the electronic apparatus 300. For example, the electronic device 300 may combine transmission power with piconets adjacent to the Wi-Fi channel where the piconet in which the electronic device 300 is located among other piconets with the same time slot synchronized by the external coordinator 100 is present.

At operation S930, the electronic device 300 may transmit to the external coordinator 100 through a Probe Request frame in which the electronic device 300 requests available frequency hopping channel information.

At operation S940, the external coordinator 100 may determine radio frequency channel state information. For example, the radio frequency channel may include a 2.4

GHz Wi-Fi channel and a Bluetooth channel. The external coordinator 100 may determine the radio frequency channel state information based on the occupancy state information of the radio frequency channel and the time ratio information of the radio frequency channel.

At operation S950, the external coordinator 100 may create a channel map in which the available frequency hopping channels of the electronic device 300 are mapped to available times based on the determined radio frequency channel state information. The channel map may include available information on 79 Bluetooth hopping channels.

At operation S960, the external coordinator 100 may periodically transmit the channel state information and channel map information to the electronic apparatus 300 via the Probe Response frame.

At operation S970, the electronic apparatus 300 may control frequency hopping based on the channel state information and channel map information received from the external coordinator 100.

For example, the electronic apparatus 300 may control frequency hopping such that the piconet including the electronic apparatus 300 among a plurality of piconets with adjacent piconets in terms of time. In addition, the electronic apparatus 300 may control frequency hopping to perform frequency hopping at intervals of a predetermined number of hopping channels.

At operation S980, the electronic apparatus 300 may perform frequency hopping at intervals of the time slot and the number of hopping channels synchronized at operation S970.

Regarding the Probe Request and the Probe Response used in FIGS. 4B and 9, references are made from frames defined in the IEEE 802.11 standard.

Figure 10:
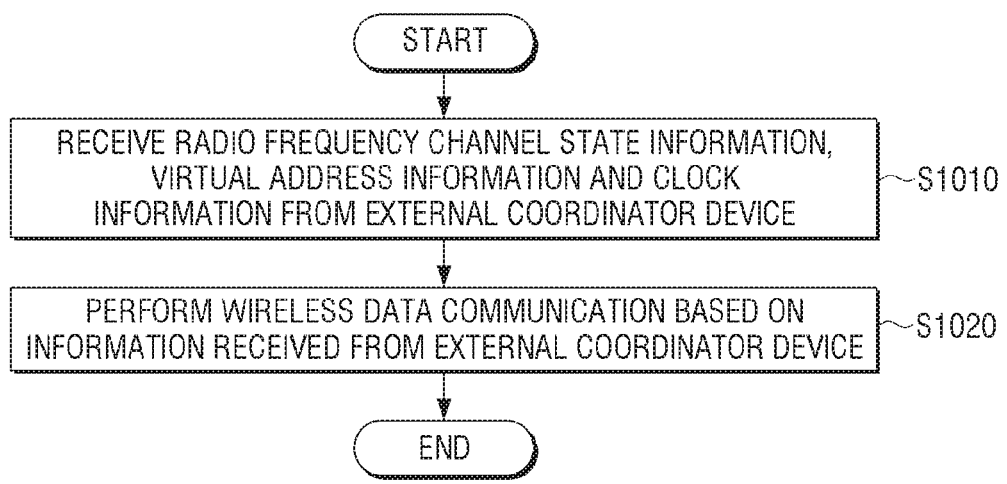
FIG. 10 is a flowchart of an electronic apparatus illustrating a control method of the electronic apparatus according to an embodiment of the present disclosure.

FIG. 10 is a flowchart of an electronic apparatus illustrating a control method of the electronic apparatus according to an embodiment of the present disclosure.

Referring to FIG. 10, at operation S1010, the electronic apparatus 300 may receive radio frequency channel state information, virtual address information and clock information from an external coordinator device. Since the characteristic of the operation S1010 has been described in detail in the present disclosure, a description thereof is omitted here.

At operation S1020, the electronic apparatus 300 may perform wireless data communication based on information received from the external coordinator device. The wireless data communication may refer to packet transmission between Bluetooth devices using a frequency hopping method. Since the characteristic of the operation S1020 has been described in detail in the present disclosure, a description thereof is omitted here.

The methods according to one or more embodiments of the present disclosure may be implemented as a program command type that may be performed through various computer units and may be recorded in a computer readable medium. The computer-readable medium may include a program command, a data file, a data structure or the like, alone or a combination thereof. For example, the computer-readable medium may be stored in a volatile or non-volatile storage device such as a read only memory (ROM), a memory such as a random access memory (RAM), a memory chip, and a device or an integrated circuit, or a storage medium which may be read with a machine (e.g., computer processing unit (CPU)) simultaneously with being optically or magnetically recorded like a compact disc (CD), a digital versatile disc (DVD), a magnetic disk, a magnetic tape, or the like, regardless of whether it is deleted or again recorded.

The memory, which may be included in an electronic apparatus 300, may be one example of a storage medium which may be read with programs including instructions implementing the various embodiments or a machine appropriate to store the programs. The program commands recorded in the computer-readable medium may be designed for the various embodiments or be known to those skilled in a field of computer software.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for controlling a wireless communication network by an electronic apparatus, the electronic apparatus being configured as a master device for controlling a piconet from among a plurality of piconets in the wireless communication network, the method comprising:
   periodically receiving, from an external coordinator device, an allocation of radio frequency channel state information, virtual address information, and clock information corresponding to the piconet;
   transmitting, to the external coordinator device, a combination of transmission power of piconets from among the plurality of piconets, which have a same synchronized time slot as the piconet of the electronic apparatus, with a transmission power of the piconet of the electronic apparatus;
   performing wireless data communication based on the radio frequency channel state information, the virtual address information, and the clock information; and
   performing frequency hopping in the synchronized time slot based on the clock information, which is sent to the piconet and other piconets from among the plurality of piconets.

2. The method of claim 1, further comprising:
   determining, by the external coordinator device, the radio frequency channel state information based on occupancy state information of a radio frequency channel and busy time ratio information being used by the radio frequency channel,
   wherein each of the plurality of piconets comprises information on a channel map including frequency channel information that is available for the wireless data communication.

3. The method of claim 2, wherein the performing of the wireless data communication further comprises:
   synchronizing time with the other piconets that are located on an adjacent channel to the piconet based on the clock information, and
   performing the frequency hopping in the synchronized time slot using the piconet and the other piconets based on the synchronized time of the other piconets and the piconet.

4. The method of claim 3, wherein the performing of the frequency hopping further comprises:
   performing the frequency hopping at intervals of a predetermined number of Bluetooth channels.

5. The method of claim 4,
   wherein the radio frequency channel comprises a Wi-Fi channel, and wherein the predetermined number of Bluetooth channels comprises a maximum number of the Bluetooth channels capable of being included in the Wi-Fi channel.

6. The method of claim 1, wherein the periodic receiving of the radio frequency channel state information further comprises:
receiving synchronization information from the other piconets from among the plurality of piconets synchronized by the external coordinator device based on the virtual address information and the clock information.

7. The method of claim 6, further comprising:
requesting, from the external coordinator device, radio frequency channel information.

8. The method of claim 1, wherein the virtual address information and the clock information are periodically allocated by the external coordinator device to each of the plurality of piconets using a predetermined input parameter.

9. An electronic apparatus for controlling a wireless communication network, the electronic apparatus configured as a master device for controlling a piconet from among a plurality of piconets in the wireless communication network, the electronic apparatus comprising:
a transceiver configured to perform wireless network communication with an external device; and
at least one processor configured to control the transceiver to:
periodically receive, from an external coordinator device, an allocation of radio frequency channel state information, virtual address information, and clock information corresponding to the piconet,
control the transceiver to transmit, to the external coordinator device, a combination of transmission power of piconets from among the plurality of piconets, which have a same synchronized time slot as the piconet of the electronic apparatus, with a transmission power of the piconet of the electronic apparatus,
perform the wireless network communication based on the radio frequency channel state information, the virtual address information, and the clock information, and
perform frequency hopping in the synchronized time slot based on the clock information, which is sent to the piconet and other piconets from among the plurality of piconets.

10. The electronic apparatus of claim 9,
wherein the radio frequency channel state information is determined by the external coordinator device based on occupancy state information of a radio frequency channel and busy time ratio information of the radio frequency channel, and
wherein each of the plurality of piconets comprises information on a channel map including frequency channel information that is available for the wireless network communication.

11. The electronic apparatus of claim 10, wherein the at least one processor is further configured to:
synchronize time with the other piconets that are located on an adjacent channel to the piconet based on the clock information, and
perform the frequency hopping in the synchronized time slot using the piconet and the other piconets based on the synchronized time of the other piconets and the piconet.

12. The electronic apparatus of claim 11, wherein the at least one processor is further configured to perform the frequency hopping at intervals of a predetermined number of Bluetooth channels.

13. The electronic apparatus of claim 12,
wherein the radio frequency channel comprises a Wi-Fi channel, and
wherein the predetermined number of Bluetooth channels comprises a maximum number of the Bluetooth channels capable of being included in the Wi-Fi channel.

14. The electronic apparatus of claim 9, wherein the at least one processor is further configured to control the transceiver to receive synchronization information from the plurality of piconets synchronized by the external coordinator device based on the virtual address information and the clock information.

15. The electronic apparatus of claim 14,
wherein the at least one processor is further configured to:
request the external coordinator device for the radio frequency channel state information.

16. The electronic apparatus of claim 9, wherein the virtual address information and the clock information are periodically allocated to each of the plurality of piconets using a predetermined input parameter of the external coordinator device.

17. A coordinator device for performing wireless communication with a plurality of piconets, the coordinator device comprising:
a transceiver configured to perform the wireless communication with the plurality of piconets; and
at least one processor configured:
control the transceiver to periodically transmit radio frequency channel state information to the plurality of piconets,
control the transceiver to receive, from an electronic apparatus, a combination of transmission power of piconets from among the plurality of piconets, which have a same synchronized time slot as the piconet of the electronic apparatus, with a transmission power of the piconet of the electronic apparatus,
allocate virtual address information and clock information, which corresponds to each of the plurality of piconets, to other piconets of the plurality of piconets, and
control the transceiver to perform frequency hopping in the synchronized time slot based on the clock information, which is sent to each of the plurality of piconets.

18. The coordinator device of claim 17, wherein the at least one processor is further configured to:
determine the radio frequency channel state information based on occupancy state information of a radio frequency channel and busy time ratio information being used by the radio frequency channel,
create a channel map comprising frequency channel information that is available for each of the plurality of piconets to perform the wireless communication, and
control the transceiver to transmit the channel map to each of the plurality of piconets.

19. The coordinator device of claim 18,
wherein the radio frequency channel comprises a Wi-Fi channel, and
wherein the frequency channel information comprises Bluetooth channel information.

20. The coordinator device of claim 17, wherein the at least one processor is further configured to periodically allocate the virtual address information and the clock information to each of the plurality of piconets using a predetermined input parameter through the transceiver.

* * * * *